J. TASHIMA.
RICE COOKER.
APPLICATION FILED FEB. 8, 1917.
Patented Aug. 21, 1917.
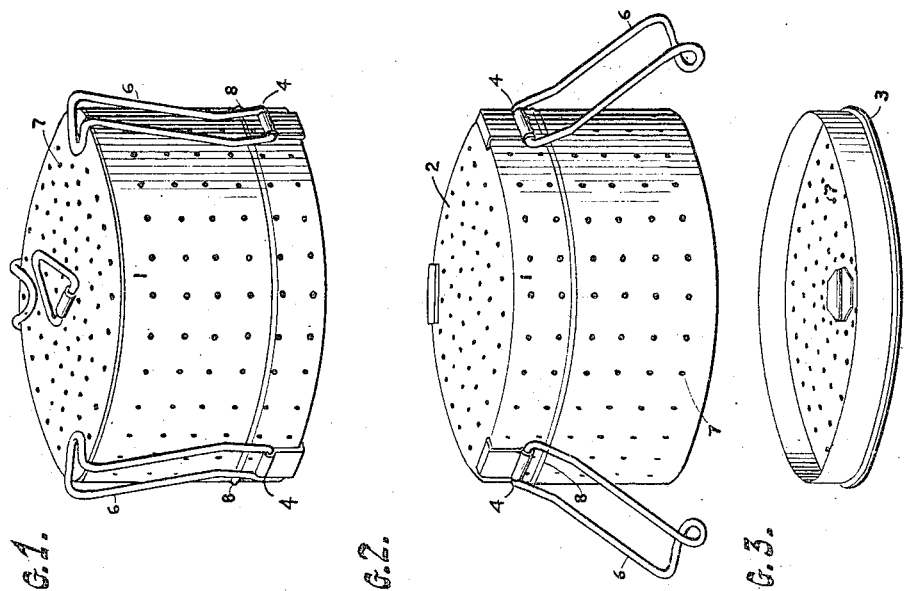
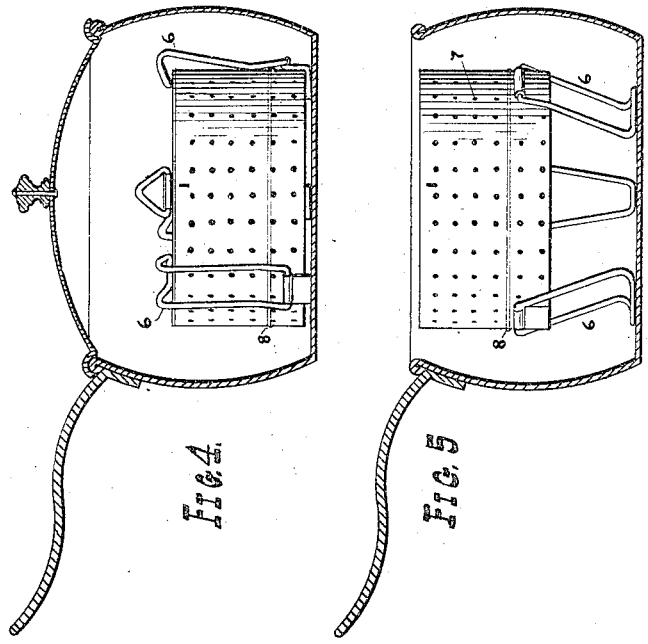
INVENTOR
JOE TASHIMA.
By *[signature]*,
Attorney

UNITED STATES PATENT OFFICE.

JOE TASHIMA, OF SAN FRANCISCO, CALIFORNIA.

RICE-COOKER.

1,237,580.  Specification of Letters Patent.  Patented Aug. 21, 1917.

Application filed February 8, 1917. Serial No. 147,307.

*To all whom it may concern:*

Be it known that I, JOE TASHIMA, a subject of the Emperor of Japan, residing at San Francisco, in the county of San Francisco and State of California, have invented new and useful Improvements in Rice-Cookers, of which the following is a specification.

The object of the present invention is to provide a vessel in which rice can be cooked uniformly and without loss or burning of the rice, by which the rice can be easily washed before cooking, and which will also serve as a means for boiling eggs, steaming puddings and straining vegetables or tea or coffee.

In the accompanying drawing, Figure 1 is a perspective view, looking toward the top, of my improved cooking vessel; Fig. 2 is a similar view looking toward the bottom of the vessel, the cover being removed; Fig. 3 is a similar view of the cover detached; Fig. 4 is a vertical section of a boiler showing my improved cooking vessel therein in side elevation; Fig. 5 is a similar view showing the cooking vessel standing in a different position in the boiler.

Referring to the drawing, 1 indicates my improved rice cooker, which is cylindrical in form and has a closed bottom 2 and an open top closed by a cover 3. To said bottom are hinged, as shown at 4, wire clamps 6 bent at their outer ends so as to extend inward over the cover of the vessel and hold the same firmly therein. As shown in Fig. 5, said clamps may also be extended to form legs supporting cooking vessel within the boiler. Both the cylindrical side and the bottom of the cooking vessel, and the cover are formed with a large number of openings 7, too small to permit grains of rice to pass therethough, but readily admitting water into the cooking vessel.

To cook rice in this vessel, the rice is first soaked in water in the vessel in order to remove the dust; the vessel is then filled with rice to the level of a circumferential crimp 8 formed on its cylindrical surface and is placed on the bottom of the boiler, the hinges 4, however, preventing bottom of the cooking vessel from being in actual contact with the bottom of the boiler. Water is then supplied to the boiler to the level of the top of the cooking vessel, and the boiler is placed upon the stove and left for 20 minutes, if it is desired that the rice be cooked medium soft, or 17 minutes if not so soft, and for 25 minutes if very soft.

One great advantage of this improved cooker is that it prevents the water in the boiler from boiling over on to the stove. A further advantage is that cooking of the rice is always uniform.

It is evident that the cooker can be used equally well for boiling eggs, or steaming puddings, or for straining vegetables, or tea or coffee.

It forms a useful container for containing the rice when cooked, as it permits of the free circulation of the air around the rice.

I claim:

1. A rice cooker comprising a vessel having a closed bottom and open top, a detachable cover for closing said top, all the sides of the vessel and the cover having therethrough numerous apertures too small to permit the escape of grains of rice, and clamping members hinged to the vessel and having hooked ends adapted to engage said cover, and also adapted to serve as legs for supporting the vessel.

2. A rice cooker comprising a vessel having a closed bottom and open top, a detachable cover for closing said top, all the sides of the vessel and the cover having therethrough numerous apertures too small to permit the escape of grains of rice, and, hinged to the vessel, clamping members with hooked ends adapted to engage said cover, and adapted to serve as legs for supporting the vessel, and also when turned in the opposite direction to serve as hangers to suspend the same on the edge of the boiler.

JOE TASHIMA.